(No Model.)

J. F. DONOVAN.
STENCH TRAP.

No. 333,841. Patented Jan. 5, 1886.

Witnesses:
W. J. Bellows
Wm. Miller

Inventor,
Jas. F. Donovan
per Brown Bros.
attys.

UNITED STATES PATENT OFFICE.

JAMES F. DONOVAN, OF FALL RIVER, MASSACHUSETTS.

STENCH-TRAP.

SPECIFICATION forming part of Letters Patent No. 333,841, dated January 5, 1886.

Application filed May 25, 1885. Serial No. 166,633. (No model.)

*To all whom it may concern:*

Be it known that I, JAMES F. DONOVAN, of Fall River, in the county of Bristol and State of Massachusetts, have invented certain new and useful Improvements in Stench-Traps, of which the following is a full, clear, and exact description.

This invention relates to a stench-trap for use in the water system of dwelling-houses, buildings, &c., and more particularly to that class of such traps known as "round traps"—that is, traps made of a round or cylindrical shape—having at one end a clean-out opening provided with a screw-stopper for opening and closing it, and side openings or passages for making the water-connections desired, and in a manner to secure standing water in the body of the trap and a water-seal of the inlet-water passage of the trap. These round traps, as well known, are very liable to siphonage, and the principal purpose of this invention is to remedy such liability; and to that end it consists in an extension of the walls of the water-outlet passage into and partially across the chamber of the trap, with an upward inclination from the side wall and toward the center of the trap-body, but so as to leave an open communication for the escape and discharge of the water from the trap through the outlet-passage thereof.

Figure 2:
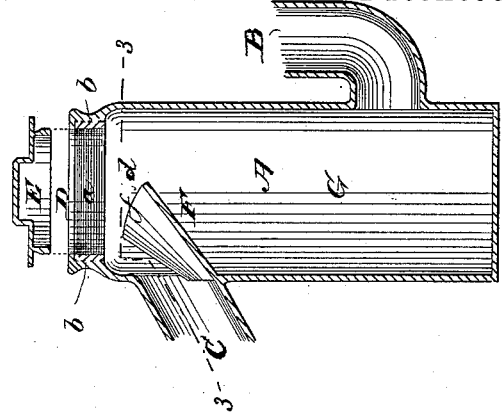
Figure 1:
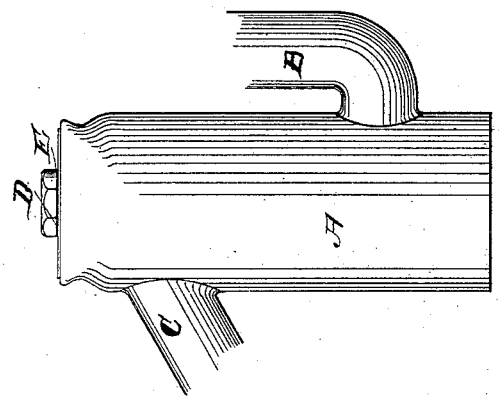
Figure 3:
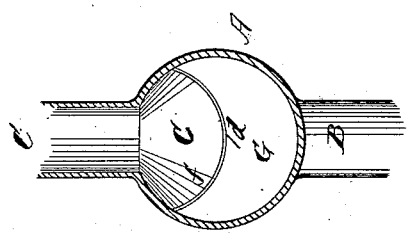

In the drawings forming a part of this specification, Figure 1 is a side elevation of the improved stench-trap. Fig. 2 is a central vertical section with the screw-threaded stopper closing the clean-out opening removed. Fig. 3 is a horizontal section on line 3 3, Fig. 2.

In the drawings, A is the body of the trap, having an inlet-passage, B, and outlet-passage C, a clean-out opening, D, and a screw-stopper, E, for closing said opening, and which is provided with a screw-thread, $a$, suitable to receive the same, all as usual, except as hereinafter particularly described. The body A is made of cast-lead, and the walls $b$ of its clean-out opening D of extra or increased thickness, as shown, and tapped out with the screw-thread $a$, before referred to.

F is an upward and inclining extension of the discharge or outlet passage C of the trap into and across and toward the center of the water-chamber G of the trap-body. This extension F makes continuation of the lower wall or side of the discharge-passage C, and it extends from side to side of the chamber, and at its upper edge, $d$, it is open, as at $f$, to the water-chamber of the trap, for the flow of the water therefrom over and upon it, and thence through it to the discharge or outlet passage C of the trap. This extension F acts as a guard or fender to the outside passage, C, of the trap, and as the water of the trap can only escape from it by passing over its upper edge the siphonage of the trap is absolutely prevented. The upper edge, $d$, of the fender to the discharge-passage C serves to break up the grease which has accumulated in the trap when the same is forced out of the trap by the running of the same, delivering it as so broken into the discharge-passage C.

Having thus described my invention, I claim—

1. A stench-trap made of a cylindrical body, A, having inlet and outlet passages B C entering its vertical sides one below the other, and the trap-chamber thereof, provided with an upward-projecting extension, F, in continuation of the outlet-passage C, and acting as a direct guard or fender thereto, substantially as described, for the purpose specified.

2. A strench-trap made of a cylindrical body, A, having a clean-out opening, D, at its upper end closed by an attachable and detachable cover or stopper, E, and inlet and outlet passages B C entering its vertical sides one below the other, and the trap-chamber thereof provided with an upward-projecting extension, F, in continuation of the outlet-passage C, and acting as a direct guard or fender thereto, substantially as described, for the purpose specified.

In testimony whereof I have hereunto set my hand in the presence of two subscribing witnesses.

JAMES F. DONOVAN.

Witnesses:
ALBERT W. BROWN,
WM. S. BELLOWS.